United States Patent [19]

Audouin et al.

[11] Patent Number: 5,307,191
[45] Date of Patent: Apr. 26, 1994

[54] COMMUNICATIONS METHOD AND NETWORK WITH FREQUENCY ALLOCATION

[75] Inventors: Olivier Audouin, Savigny sur Orge; Jean-Michael Gabriagues, Le Val Saint-Germain; Michel Sotom, Villebon sur Yvette, all of France

[73] Assignee: Alcatel N.V., Amsterdam, Netherlands

[21] Appl. No.: 825,143

[22] Filed: Jan. 24, 1992

[30] Foreign Application Priority Data

Jan. 24, 1991 [FR] France ............... 91 00794

[51] Int. Cl.$^5$ .............. H04B 10/20; H04J 14/02
[52] U.S. Cl. ............... 359/125; 359/120; 370/69.1; 370/95.1
[58] Field of Search ........... 370/69.1, 76, 95.1; 359/120-121, 124-125

[56] References Cited

U.S. PATENT DOCUMENTS

| 4,339,816 | 7/1982 | Reed | 370/76 |
| 4,797,879 | 1/1989 | Habbab | 359/121 |
| 4,868,811 | 9/1989 | Suzuki | 370/76 |
| 5,093,743 | 3/1992 | Eng | 359/120 |
| 5,127,067 | 6/1992 | Delcoco | 359/120 |

OTHER PUBLICATIONS

Habbab et al, "Protocols for Very High-Speed Optical Fiber Local Area Networks Using a Passive Star Topology", *J of Lightwave Technology* v. LT-5 n.12, Dec. 1987.

N. Shimosoka, et al., "Photonic Wavelength-Division . . .", IEEE Photonics, Techn. Letters, N.Y., vol. 2, No. 4, Apr. 1990, pp. 301-303.

H. G. Alles, "An Intelligent Network . . . ", Proceedings, 1978 Int'l. Zurich Seminar on Digital Comm., Zurich, Mar. 1978, pp. A5.1-A5.6.

S. Suzuki, et al., "A Photonic Wave length-Division . . . ", Conf. Record, IEEE Int'l. Conf. on Comm., Boston, Jun. 1989, vol. 2, pp. 722-727.

*Primary Examiner*—Leslie Pascal
*Attorney, Agent, or Firm*—Robbins, Berliner & Carson

[57] ABSTRACT

Calls are made in known manner between terminals in the form of information-carrying modulation applied to emission waves that travel along common transmission lines. An emission frequency (F(2P−1)) is allocated to each terminal for each call. According to the invention, a marking wave is supplied to all of the terminals while no call is yet being set up, thereby marking an emission frequency. When a new call is being set up, the marked frequency is allocated for the new call to at least one of the terminals that are to participate in the call. The invention is particularly applicable to communications by means of optical fibers.

6 Claims, 7 Drawing Sheets

COMMUNICATIONS METHOD AND NETWORK WITH FREQUENCY ALLOCATION

The present invention relates in particular to a communications network. In the network, calls are made between terminals in the form of information-carrying modulation applied to "emission" waves that travel along transmission lines interconnecting the terminals. Since a plurality of emission waves travel together over the same transmission line, it is necessary to establish spectrum distances between the corresponding emission frequencies in order to avoid cross-talk. That is why an emission frequency is allocated to each terminal using a "frequency allocation" procedure during the setting up of each call in which the terminal is to emit.

BACKGROUND OF THE INVENTION

A network in accordance with the present invention may include certain items that are common as to their functions indicated below with a first known network. These items include:
- a plurality of terminals associated with respective user peripherals between which messages are to be transmitted, each of the terminals being suitable for emitting an emission wave at a controlled emission frequency which constitutes a position of the terminal within a spectrum range of the network, the terminal also being suitable to apply information-carrying modulation to said wave so as to cause it to convey one of said messages;
- two transmission lines associated with each of said terminals to guide waves and which are constituted by an emission line for guiding said emission wave from said terminal and a reception line for guiding waves received by said terminal;
- a star coupler for receiving said emission waves over said emission lines and for transmitting each of said waves to all of the terminals via said reception lines such that the positions of the various terminals must remain at mutual distances apart that are not less than a predetermined frequency increment; and
- frequency allocation means for allocating positions to the terminals for the calls in which they are to participate.

The emission frequencies of the various terminals in such a network vary over time. But to avoid such variations giving rise to cross-talk, the spectrum distances between emission frequencies must remain at not less than one frequency increment. The frequency increment is selected to reserve a message channel of adequate bandwidth for each call within the spectrum range of the network. Starting from a base frequency, these frequencies thus constitute a sequence which is referred herein as a "stack" and which extends up to a top of the stack. This sequence corresponds to the sequence of message channels including said frequencies and also the sequence of terminals utilizing said frequencies. In each of these sequences an item may be adjacent to another item, i.e. it may precede it or it may follow it. The top of the stack is constituted by one of the emission frequencies or, for a call established over a plurality of frequencies, by a group of such frequencies being used for the same call and which are adjacent, for example, said frequency or group of frequencies being the furthest from the base frequency.

The various terminals may be identical to one another. That is why, to facilitate the description of the operation of such a network consideration is sometimes given more particularly to one of the terminals, which may be constituted by any one of them and which is referred to as the "terminal under consideration".

It will be understood that the word "wave" used herein is capable of designating waves or signals that may be at various different frequencies, and that may be of various different kinds, e.g. electromagnetic or acoustic. Nevertheless, the present invention relates more particularly, but not exclusively, to the case where said emission waves are optical waves and where said transmission lines are optical fibers for guiding said waves.

The said first known network constitutes one such network. It is described in a first prior document constituted by European patent Document EP-A-381 102 (F*16761). That document explains how the emission frequency of the terminal under consideration is established as it prepares to begin a call. The frequency is established by a "support". Such a "support" consists in the terminal under consideration establishing its emission frequency relative to a support frequency in such a manner that the spectrum distance between said emission frequency and its support frequency is equal to one of said frequency increments. A support frequency is typically constituted by the emission frequency of another terminal.

To implement such support, the terminal under consideration scans the spectrum range of the network. Such scanning enables it to identify possible emission frequencies that are not busy and that are therefore available for emitting the message to be transmitted. An emission frequency identified in this way is selected and is used initially to send calling signalling which includes, at least, an address for the called terminal. The duration of such scanning increases the access time of terminals to the network, i.e. the time which elapses on average between the instant when the terminal receives an instruction from the associated user peripheral to transmit a message and the instant at which said transmission begins.

A second known network is described in a second prior document constituted by an article "Protocols for very high-speed optical fiber local area networks using a passive star topology" (Isam M. I. Habbab, Mohsen Kavehrad, and Carl-Erik W. Sundberg, Journal of Lightwave Technology, Vol. LT-5, No. 12, December 1987, pp. 1782–1793).

The spectrum range of said second known network includes a plurality of message channels and a signalling channel and the positions of the channels appear to be predetermined. The signalling channel is reserved for transmitting signalling making it possible, in particular, for a calling terminal to indicate a message channel to the called terminal for use in a call.

A particular object of the present invention is to limit the access time of a terminal to such a network.

SUMMARY OF THE INVENTION

To this end, the present invention provides, in particular, a communications method with frequency allocation in which a marking wave is supplied to all of the terminals, thereby marking an emission frequency while no call is being set up, and then when a new call is being set up, said marked frequency is allocated for said new call to at least one of the terminals that is to engage in the call.

BRIEF DESCRIPTION OF THE DRAWINGS,

Embodiments of the invention are described by way of example with reference to the accompanying drawings, in which.

DETAILED DESCRIPTION

Figure 1:
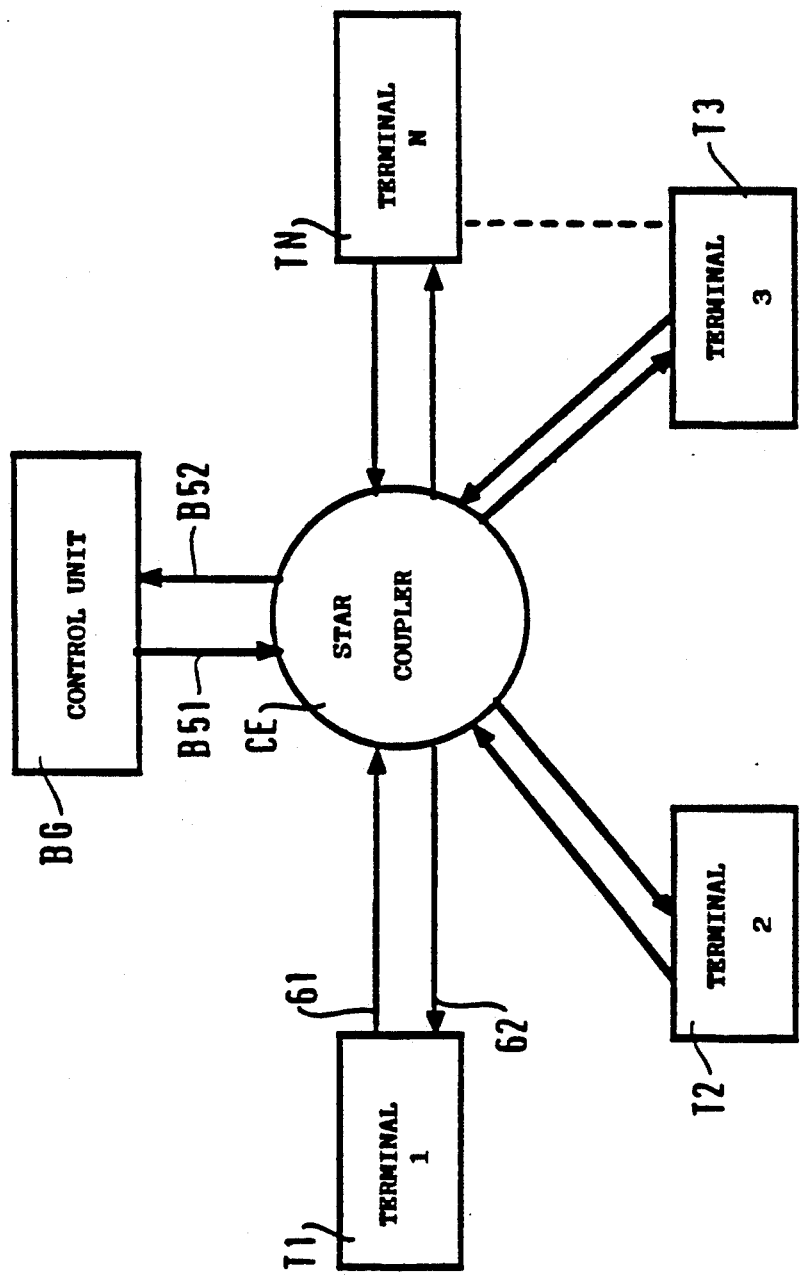
FIG. 1 is an overall view common, in particular, both to a first data network and to a second data network given as examples of implementations of the present invention.

With reference to FIG. 1, the present description begins by recalling the general structure common to networks of this kind. Such a network comprises the following items:

a plurality of terminals (T1, T2, T3, ..., TN) associated with respective user peripherals between which messages are to be transmitted;

two optical fibers associated with each of said terminals (T1) for guiding optical waves, said fibers comprising an emission fiber (61) for guiding emission waves emitted at an emission frequency of the terminal and a reception fiber (62) for guiding waves that are to be received by the terminal; and a star coupler (CE) for receiving the optical waves that reach it via said emission fibers, and for transmitting each of said optical waves to all of said terminals via said reception fibers.

Figure 3:
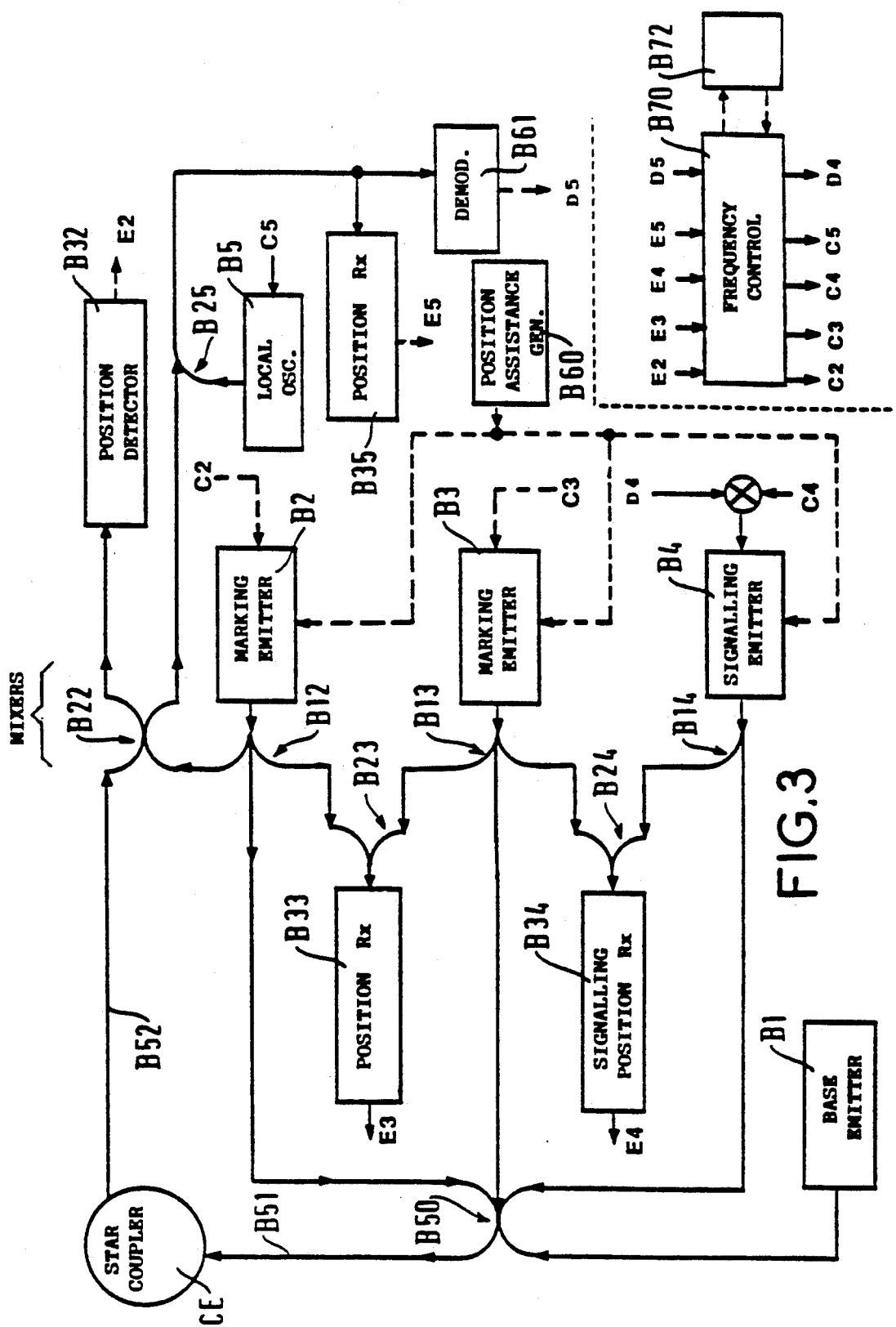
FIG. 3 is a block diagram of a control unit belonging to said network.

A control unit BG includes a base generator (B1) which is shown in FIG. 3 and which emits an optical base wave at a base frequency (FO) to constitute a frequency reference for controlling said emission frequencies.

In such a network, each of the terminals is sometimes free and sometimes busy. When it is busy, it may be precalling and/or precalled and then it may be calling or called.

A terminal is calling and emitting while it is transmitting a message to a called terminal in the form of information-carrying modulation on an optical carrier wave which constitutes an emission wave from said terminal and which is emitted for a call duration. It is assumed below that the frequency specific to said carrier wave constitutes simultaneously an emission frequency and spectrum position of said terminal, and a transmission frequency for said message. It can be varied on command over a spectrum range of the network. Its position within said range may be defined on the basis of the base frequency. Below, when it is said that said transmission frequency is, at a given instant, more or less close or more or less distant or that in the course in time it moves closer or it moves away, the description relates to the closeness or the distance of said transmission frequency relative to said base frequency. To simplify some of the explanation, the case where the base frequency is lower than the emission frequencies is sometimes considered more particularly, and words such as "higher" and "lower" applied to frequencies relate to such circumstances. The frequencies of the modulated emission wave lie in a message channel which is reserved within the frequency range of the network for transmitting a message, and which for said purpose has a message spectrum width. This wave is received by the called terminal and constitutes for said terminal a reception wave whose frequency constitutes a reception frequency. The terminal is then receiving. The calling and the called terminals are in pairs forming respective pairs of terminals in communication with each other.

Communication may be one-way. A single message is then transmitted. It is transmitted from the calling terminal to the called terminal. Communication may also be two-way. Under such circumstances, it may be performed in so-called "alternating" mode. The calling terminal and the called terminal then take up the same position in the spectrum and the same message channel is occupied by go messages and by return messages which follow one another in time. Two-way communication may also be performed in so-called "duplex" mode. Under such circumstances, the above-mentioned message then constitutes a go message occupying a go message channel. The called terminal is suitable for responding to said message by emitting a return message during the same call period. The return message is transmitted to the calling terminal on an optical carrier wave which occupies a return message channel and which constitutes an emission wave for the called terminal and a reception wave for the calling terminal. A call is then constituted by the go and receive message channels taken together.

A free terminal becomes a precalling terminal when, in response to an instruction from the user peripheral associated therewith, it prepares or emits a calling signal including the address of a precalled terminal for the purpose of then setting up a call during which said precalling terminal and said precalled terminal become a calling terminal and a called terminal respectively.

There follows a description in general terms of the various dispositions which have been found to be advantageous, in particular in the context of the present invention, for implementing networks of this kind. These dispositions are adopted in the two networks given by way of example and they will be better understood during the subsequent description of these networks in more concrete terms.

The terminals of the networks are similar to one another. That is why only one of them is considered when describing their internal structure. In a disposition that is common to the first previously-mentioned known network and to the two networks given as examples of the present invention, the terminal under consideration includes the following items:

an emitter (1) controllable at least in frequency to emit said emission wave and to apply information-carrying modulation to said wave;

emission positioning means for positioning the emission frequency of said emitter in a spectrum range of the network, by faming a stack of emission frequencies which are variable and which follow one another starting from a fixed base frequency and going to the top of the stack, and being separated from one another by spectrum distances that are not less than a predetermined frequency increment;

reception means for demodulating some of the waves received by the terminal under consideration; and a control circuit (40) for controlling the emitter, the emission positioning means, and the reception means.

The emission positioning means of the terminals are such that their emission frequencies form a sequence of frequencies at intervals with bottom limits in which each next frequency is separated from a preceding frequency by an inter-terminal distance that cannot drop significantly below a predetermined frequency increment (DF) that is greater than said message spectrum width. That is why the positioning means of the terminal in question include emission support means themselves including the following items:

an emission positioning mixer (31) for mixing the waves received by the terminal in question with a local emission positioning wave having a local emission positioning frequency (F(2P−1)A) in the optical range and which is applied to a local input (31A) of the mixer by the emitter (1) of the terminal to represent its emission frequency (F(2P−1));

an emission positioning detector (10) fed by said emission positioning mixer to form electrical beat signals each resulting from the mixing of said local emission positioning wave with one of said received waves which corresponds to said signal, at least one of said signals constituting an emission positioning beat signal (F(2P−2)BE) if that one of said received waves which corresponds thereto constitutes an external emission positioning wave (F(2P−1)B) defining a support frequency (F(2P−2)) of the terminal under consideration, the frequency of said signal constituting an emission positioning beat frequency (F(2P−1)A−F(F(2P−2)B) which defines a support distance (F(2P−1)−F(F(2P−2)) between said emission frequency (F(2P−1)) and said support frequency (F(2P−2)), one of said received waves constituting said external positioning wave only if said support distance is situated in a predetermined support interval including said frequency increment (DF);

an emission position discriminator (11) for receiving said emission position beat signal and for responding thereto by providing an emission position signal representative of an emission position difference equal to the difference between said emission positioning beat frequency (F(2P−1)A−F(2P−2)B) and a reference emission positioning frequency (DF−2FS) such that eliminating said difference means that the difference between said emission frequency (F(2P−1)) and said support frequency (F(2P−2)) of the terminal under consideration is equal to said frequency increment (DF); and emission position control means (40) which control said emission frequency of said terminal in response to said emission position difference signal to make said emission positioning beat signal equal to said emission positioning reference frequency.

If the terminal under consideration is at spectrum distances more or less equal to the increment DF both as a preceding terminal and as a following terminal, then the detector 10 delivers two emission positioning beat signals.

That is why, in an advantageous disposition, the emission position discriminator (11) includes an emission positioning filter for selecting and superposing two of said emission positioning beat signals, said filter being set to a frequency equal to said emission positioning reference frequency and having a narrow passband centered on said frequency, said emission position signal being representative of the power of the output signal from said filter, and said emission position control means (40) controlling said emission frequency (F(2P−1)) of said terminal to deliver said maximum amplitude.

The reception means may be of the heterodyne type and may include the following items:

a local oscillator (2) for providing a local reception wave which is optical and whose frequency is controllable, constituting a local reception frequency (L(2P−1)) of the terminal under consideration;

a heterodyning mixer (32) receiving firstly said waves received by the terminal under consideration, such a wave constituting one of said reception waves and having one of said reception frequencies (F(2P)) for the terminal under consideration when the message carried by said wave is to be transmitted to said terminal, said mixer receiving secondly said local reception wave and mixing said wave with said received waves;

a heterodyning detector (20) fed by said heterodyning mixer to provide electrical beat signals, one of which is a reception beat signal (K(2P)H) having a reception beat frequency which is the difference between said reception frequency and said local reception frequency and which is close to a predetermined intermediate frequency (FI);

a demodulation filter (22) for receiving said reception beat signal, for demodulating it, and for providing a demodulated signal representative of said information to be transmitted to the terminal under consideration and carried by said reception wave;

a frequency discriminator constituting a reception position discriminator (21) for receiving said reception beat signal and for responding thereto by providing a reception position error signal representative of the difference between said reception beat frequency and said intermediate frequency (FI); and reception position control means (40) which controls said local reception frequency in response to said reception position error signal to make said reception beat frequency equal to said intermediate frequency.

The control circuit of the terminal under consideration is connected to the user peripheral associated with said terminal to receive therefrom a message to be transmitted. It includes modulation means which control the emitter of said terminal accordingly to provide said information-conveying modulation of the emission wave when the terminal under consideration is emitting. It includes said emission position control means. It receives said demodulated signal and includes address-recognition means for recognizing the address of the terminal under consideration. It switches the terminal to receive mode when said address has been recognized and it subsequently transmits the received message to the associated user peripheral. It receives said reception beat signal and it includes said means for controlling reception position.

In addition, the terminal under consideration is suitable for emitting and receiving signalling in the form of modulation which affects optical carrier waves that are guided by said emission and reception fibers of said terminal and which are transmitted via said star coupler. Such signalling includes a calling signal which is emitted by the terminal when it is precalling and which includes the address of the precalled terminal.

In an advantageous "stack compression" disposition, the control circuit of the terminal under consideration is permanently ready, i.e. at all instants throughout the duration of a call, to vary the emission frequency of the terminal.

Such variation is performed if a support frequency lower than the terminal (as defined below) moves towards the base frequency. Under such circumstances, the emission frequency of the terminal under consideration accompanies the displacement of said support frequency. Such a variation is also performed if such a lower support frequency that was previously in use disappears. Under such circumstances, the emission frequency moves progressively towards the base frequency until a new lower support frequency can be defined. The new lower support frequency may be the emission frequency of a preceding terminal if such a terminal exists, or it may be the base frequency itself.

The emission positioning means of the terminal under consideration enable it to perform these functions by means of the above-mentioned items except that the emission position control means include stack compression means for this purpose which may be incorporated in the control circuit of the terminal and which are as follows:

initial emission positioning means which are put into action when the terminal under consideration becomes free or at least before the beginning of a new call, these means bring the current emission frequency of the terminal under consideration to the top of the stack of the emission frequencies of the various terminals; for example they may move said frequency progressively away from the previously used emission frequency until they detect that said emission frequency has indeed reached the top of the stack;

lower support detection means for detecting the possible presence amongst the waves received by the terminal under consideration of an external lower emission positioning wave constituted by one of said external emission positioning waves defining a lower support frequency for the terminal; such a frequency is called a "support" frequency for the terminal providing said support frequency is closer to the base frequency than is the emission frequency of the terminal; said means provide a loss-of-lower-support signal when such an external lower emission positioning wave no longer exists;

means for servo-controlling the emission position during a call which are kept in action during the call so long as there exists one such lower support frequency for the terminal under consideration; said means are called "emission support means" and they control the emission frequency of said terminal in the manner indicated above to eliminate said difference in emission position; and emission shift means which are put into action during a call when one of said loss-of-lower-support signals is provided for the terminal under consideration; these means move the emission frequency of the terminal progressively towards the base frequency until said loss-of-lower-support signal is no longer provided.

This moving together of frequencies is performed at a shift speed which is preferably chosen to be large. However this speed must be small enough to enable the emission position servo-control means of a following terminal to follow the variation in said frequency. This is necessary because said frequency constitutes the lower support frequency for the following terminal.

A stack of emission frequencies is thus achieved for the various terminals building up from the base frequency. These frequencies follow one another at intervals, many of which are normal intervals equal to said frequency increment. A larger frequency interval appears when a terminal stops transmitting a message. Under such circumstances, the following terminal can no longer define a lower support frequency. It therefore progressively and regularly shifts its emission frequency towards the base frequency during a shift period which constitutes a fraction of said call period and which comes to an end either when a new lower support frequency can be defined or else when the call is over. If the frequency shift speed is chosen to be large enough, the shift period is small enough for large frequency gaps increasing the total width of the spectrum range required by the network to be kept to a small amount only.

In another advantageous disposition, said lower support detection means for the terminal under consideration comprise the following items:

non-selective support detection means for supplying a loss-of-support signal when one of said external emission positioning waves for the terminal no longer exists; for this purpose, these means may monitor said emission position signal which is representative of the power of the emission positioning beat signal; a predetermined drop such as a rapid drop of about 50% in said power indicates either that an external lower emission positioning wave has disappeared or else that an external upper emission positioning wave has disappeared; under such circumstances, said means trigger the appearance of the loss of support signal; and support discrimination means which are put into operation at least when said loss-of-support signal is provided and which then provide said loss-of-lower-support signal if the external emission positioning wave that has disappeared is a lower one of said external emission positioning waves.

The two networks given by way of example differ from each other as to the structure of said support discrimination means. The first network operates in duplex mode. As a result, while the terminal under consideration is engaged in a call, it uses two adjacent emission frequencies and the terminal in question is emitting either on the lower frequency or on the upper frequency of the call. It therefore constitutes either the lower terminal or the upper terminal of the pair of terminals that are communicating with each other, it being understood that the lower terminal is the terminal that comes before the other terminal in said pair in the sequence of the terminals that corresponds to the stack of emission frequencies. In the first network given by way of example, the lower terminal is the calling terminal, but it will be understood that it could equally well be the called terminal.

In an advantageous disposition, the support discrimination means of the terminal under consideration in a network operating in duplex mode records a relative position bit at the beginning of each call and retains it until the end of the call, said bit representing the fact that the terminal under consideration is calling or called and is consequently the lower terminal or the upper terminal in the pair of terminals concerned by a given call. These means provide a low indication if the terminal is the lower terminal of the pair. The said loss-of-lower-support signal is provided when said loss-of-support signal and said low indication are provided simultaneously. As a result, the pair of terminals under consideration, i.e. the pair including the terminal under consideration during a call under consideration, will offset its two emission frequencies towards the base frequency if the preceding call disappears, while, in contrast, the two emission frequencies of the pair under consideration will remain unchanged if it is the following call that disappears.

It should be understood that in practice the various means included in the control circuit are advantageously implemented in the form of program elements incorporated in said circuit.

In another advantageous disposition, the network includes a marking generator for prior marking at a marking instant one or more spectrum positions which are marked for use during the next call. These marked positions are spectrum positions which are not occupied by any of the terminals in the network at the marking instant and which are to be seized by one or more of the terminals to implement the next call, i.e. the first call to begin on the network after said instant.

Such prior marking has the advantage of reducing the access time of the network.

The structure of the marking generator may be analogous to that of the terminal under consideration except that no information-carrying modulation is required on the optical waves that it emits since the only function of these waves is to define frequencies.

It includes the following items:
an emission fiber (B51) and a reception fiber (B52) for comeding it to said star coupler (CE) like the terminal under consideration;
at least one marking emitter (B2) that is controllable in frequency to emit an optical marking wave (FM1) on said emission fiber; and
marking positioning means (B22, B32, B70) controlling the marking emitter to give the marking wave a marking frequency (FM1) having a predetermined relationship with a spectrum position that is to be seized to establish the next call by means of a terminal participating in said call, which position is thus marked by said marking wave.

The predetermined relationship is such that the marking wave facilitates and/or accelerates displacement of the emission frequency which the terminal participating in the call must perform to reach the marked spectrum position.

By way of examples of such predetermined relationships, the marking frequency may coincide with the marked position or it may be situated at a predetermined spectrum distance from said marked position, which distance is related to said frequency increment.

Naturally, when the network includes the above-mentioned stack compression means, the position(s) marked by the marking generator(s) is/are situated at the top of the stack, as described below.

In another advantageous disposition, the network includes a signalling reference generator which itself includes:
a signalling emitter (B4) which is controllable in frequency to emit an optical wave that constitutes a signalling reference wave at a signalling frequency (FZ);
signalling positioning means including signalling position servo-control means and signalling position shift means for positioning said signalling frequency in the spectrum range of the network;
an emission fiber (B51) for guiding said signalling reference wave to said star coupler (CE); and
a reception fiber (B52) for guiding optical waves that have been transmitted to the coupler and which are received by said generator.

The signalling position servo-control means are analogous to the control means of the terminal under consideration and include the following items:
a signalling positioning mixer (B24) for receiving firstly said waves received by the signalling reference generator and secondly a local signalling positioning wave that is optical and that defines said signalling frequency;
a signalling positioning receiver (B34) fed by said signalling positioning mixer to form electrical beat signals one of which is a signalling positioning beat signal that results from mixing said local signalling positioning wave with an external signalling positioning wave constituted by one of said received waves defining a signalling support frequency which is the most distant frequency in the stack of said emission frequencies, the frequency of said signal constituting a signalling positioning beat frequency lying in a predetermined range and representative of a spectrum distance between said signalling frequency and said signalling support frequency;
a signalling position discriminator (not shown) for receiving said signalling positioning beat signal and for responding thereto by providing a signalling position signal representative of the difference between said signalling positioning beat frequency and a predetermined frequency; and
signalling frequency control means (B70) which control said signalling frequency in response to said signalling position signal to servo-control the spectrum distance between said signalling frequency and said signalling support frequency to a predetermined spectrum distance supplement which constitutes a signalling supplement.

The signalling position shift means move the signalling frequency away when a new call is established, with this being done over a shift distance that is equal to a number of frequency increments equal to the number of emission frequencies that are used by the new call.

The emission positioning means of the terminal under consideration then include, in association with its said control circuit:

signalling search means for moving its emission frequency progressively away from the base frequency when the terminal becomes free, and for recognizing when said emission frequency coincides with said signalling frequency; and standby servo-control means controlled by said signalling search means to servo-control said emission frequency to said signalling frequency from the moment when coincidence between said two frequencies is recognized.

This disposition has the advantage that the access time to the network is reduced by the fact that when the terminal under consideration is free, its spectrum position is at least close to the position that it will occupy during its next call.

The control circuit (40) of the terminal under consideration further includes call signalling means for modulating said emission wave having said signalling frequency with call signalling and for emitting said signalling when a message is to be transmitted by said terminal, the frequencies of the emission wave as modulated in this way occupying a signalling channel (KZ) having a signalling spectrum bandwidth.

The terminal under consideration under includes reception standby initial positioning means (B70) for bringing said local frequency of said terminal to a spectrum position whose distance from said signalling frequency is equal to said intermediate frequency when said terminal is free so as to enable said reception means subsequently to receive messages in the signalling channel (KZ).

The said emission positioning means of the terminal under consideration include emission search means which are put into operation when the terminal is to switch to emission and which move its emission frequency towards said base frequency from said signalling frequency down to a preemission position in which one of said lower support frequencies appears for said terminal, and reception search means which are put into operation by said control circuit when said terminal is to switch to reception and which bring said local reception frequency of said terminal to a prereception position whose distance from the preemission position of one of said terminals is equal to said intermediate frequency.

The preemission position used for establishing said prereception position of the terminal under consideration is the preemission position of the same terminal if the call is being established in alternating mode. If the call is being established in duplex mode, the preemission position used is the preemission position of the terminal which is paired with the terminal under consideration.

In another advantageous disposition, the signalling reference generator is included in the control unit BG. The control unit also includes reception means similar to said reception means in the terminal under consideration and a control circuit which is analogous to said control circuit of the terminal under consideration except that firstly it does not provide communication with an associated user peripheral and secondly it is required to receive, to process, and to emit signalling over the signalling channel for the purpose of controlling the network.

In another advantageous disposition, the signalling reference generator constitutes one of said marking generators and for this purpose it further includes:

at least one first marking emitter (B2) of controllable frequency for emitting a first marking wave on said emission fiber of said generator; and first marking positioning means for giving said wave a first marking frequency (FM1).

Said first marking positioning means are analogous to the emission positioning means and include the following items:

a first marking positioning mixer (B22) for receiving firstly said waves received by the signalling reference generator and secondly a local first marking positioning wave that is optical and that defines the first marking frequency;

a first marking positioning detector (B32) fed by the first marking positioning mixer to form beat signals that are electrical, one of which is a first marking positioning beat signal resulting from mixing said local first marking positioning wave with one of said received waves that defines said signalling support frequency (F2P), the frequency of said signal constituting a first marking positioning beat frequency lying in a predetermined interval and representative of an interval between said first marking frequency and said signalling support frequency; and a first marking positioning discriminator (not shown) for receiving said first marking positioning beat signal and for responding thereto by providing a first marking position signal representative of the difference between said first marking position beat frequency and a predetermined frequency.

The control circuit (B70) of the signalling reference generator generates the first marking frequency in response to the first marking position error signal to servo-control the spectrum distance between said first marking frequency and the signalling support frequency (F2P) to said frequency increment (DF).

When the terminal under consideration is to switch to reception while in communication with another terminal which is positioned on said first marking frequency, the first marking wave enables the terminal under consideration to servo-control its local reception frequency relative to said first marking frequency without needing to wait for an emission from said other terminal for this purpose. If the marking frequency is unique, said signalling supplement is advantageously equal to twice said frequency increment.

When operating in duplex mode where two adjacent message channels are used for each call and where the terminal under consideration is the upper terminal, i.e. is to occupy the upper channel, i.e. the channel whose carrier frequency is further from the base frequency, said first marking frequency also constitutes said lower support frequency for said terminal.

Under such circumstances, a second marking frequency (FM2) follows the first at a distance equal to said frequency increment. A corresponding second marking wave is emitted by a second marking emitter (B3) provided with spectrum positioning means analogous to the above means. It enables the signalling frequency and the local reception frequency of the upper terminal to be positioned.

The signalling supplement is then advantageously equal to three times said frequency increment.

In another advantageous disposition the means for servo-controlling the emission position of the terminal under consideration further include spectrum positioning assistance means themselves including:

a positioning assistance generator (53) for providing a positioning assistance signal at a predetermined positioning assistance frequency (FS); and positioning assistance modulation means (1) for modulating at least a fraction of the emission wave from the terminal under consideration by said positioning assistance signal so as to generate two positioning assistance side waves at two positioning assistance side frequencies whose spectrum distances from the emission frequency (F(2P−1)) of said terminal are equal to said positioning assistance frequency (FS). A first side wave has a first positioning assistance side frequency (F(2P−1)A) closer to said lower support frequency (F(2P−2)) of said terminal than its emission frequency. It constitutes said local emission positioning wave transmitted to said emission positioning mixer of the terminal under consideration.

The second positioning assistance side wave formed in this way constitutes said external emission positioning wave for the terminal following the terminal under consideration.

The Positioning assistance frequency (FS) preferably lies between one-fourth and one-half of said frequency increment (DF).

These Positioning assistance means present the advantage that the emission positioning beat frequency may be much less than the support distance. It may be situated, for example, in the microwave range whereas the support distance is substantially equal to the frequency increment which is situated in the optical frequency range. The emission positioning beat signal can thus be processed by means of well-known electronic components of acceptable price. Given the presence of these positioning assistance means, it will be understood that when it is specified above that a wave, a signal, or a first frequency defines a second frequency or a spectrum distance such as a support distance, that means that the second frequency or distance defined in that way is equal to the defining frequency plus or minus a predetermined value, said defining frequency being the frequency of said wave or said signal or being said first frequency, said predetermined value being equal to one or two times the positioning assistance frequency.

In the two networks given by way of example, the frequency (F(2P−1)A−(F(2P−2)B) which defines the support distance (F(EP−A)−F(EP−2)) is equal to said distance minus twice the positioning assistance frequency (FS). Given the fact that said support distance is substantially equal to the frequency increment (DF), the frequency which defines the support distance is substantially equal to DF−2FS.

Another advantageous disposition concerns the use that may be made of a signalling channel that includes the signalling frequency and all of the frequencies occupied by the various signalling transmitted over the network to set up and control calls, and more generally to control the network.

Such signalling includes the following in particular:

calling signalling emitted by a precalling terminal and containing the address of the precalled terminal;

call acknowledge signalling emitted by the precalled terminal in response to the calling signalling to inform the precalling terminal that the precalled terminal is ready to set up a call; and signalling to allocate a call entitlement, which signalling is used when two terminals seek to establish two different calls simultaneously on the same channel, with the signalling then defining which call has priority.

The advantage of this disposition appears when many calls but not all calls need to transmit messages in limited time, with the messages each including a large quantity of data, which messages may be called "heavyweight". During "heavyweight" calls, the high data rate requires message channels of large bandwidth, whereas during other more "light-weight" calls require less bandwidth. In this disposition, the signalling channel is shared between the various network terminals not only for transmitting said signalling but also for transmitting "lightweight" messages, i.e. messages each including a relatively small amount of data.

More precisely, the terminal under consideration includes:

means for classifying messages to indicate whether a message to be transmitted is a heavyweight message that needs to be transmitted at a relatively high data rate over a relatively long call duration or whether the message is a lightweight message that can be transmitted at a relatively low data rate and/or during a relatively short call duration;

heavyweight message transmission means for transmitting said heavyweight messages in said message channels; and lightweight message transmission means for transmitting said lightweight messages in said signalling channel which then constitutes a channel that is shared between said terminals.

The message classification means are incorporated in the control circuit 40.

The heavyweight message transmission means of the terminal under consideration are the means as described above and they come into action only when the terminal is busy. Its lightweight message transmission means are the same means except that they are put into action by its control circuit while the terminal is in a situation described above as being that of a free terminal. They are put into action when the user peripheral associated with the terminal seeks to emit a message and the message is classified as being lightweight.

This disposition makes it possible, without excessively increasing the bandwidth of the signalling channel, to considerably reduce the number of message channels when the number of heavyweight messages to be transmitted per unit time is significantly smaller than the total number of messages. The spectrum available to the network is thus used more efficiently.

In another advantageous disposition, the bandwidth of the shared channel is substantially equal to said message bandwidth.

The electronic components used by the shared channel can then be substantially the same as those used by the message channels.

In another advantageous disposition, the shared channel is time multiplexed between said terminals or at least between those of said terminals that are not busy transmitting a heavyweight message, with each of the terminals transmitting lightweight messages and signalling that it needs to transmit over the time-shared channel in the time slots allocated thereto during each multiplexing cycle.

A protocol for gaining access to the shared channel is provided. It may be similar to the protocols that are already known for gaining access to a signalling channel. Call entitlements, including entitlements to establish heavyweight calls are allocated in centralized manner in the control unit BG which dialogs for this purpose with the terminals over the signalling channel. It will nevertheless be understood that such allocation could also be achieved in decentralized manner in which priority calls are defined by dialog between the terminals over the signalling channel.

There follows a more concrete description of the terminal under consideration belonging to the first network given by way of example. It may be the terminal T1 as shown in FIG. 1, for example. A star coupler of the network is designated by reference CE.

An emitter 1 and a local oscillator 2 of the terminal under consideration are constituted by means of at least two semiconductor lasers whose frequencies are controlled electrically. An emission frequency control current is provided by said emission positioning means via a regulator circuit 41.

A current controlling the emitted optical intensity includes three components:
- a DC bias component delivered by the regulator circuit 41;
- an information-carrying modulation component including relatively low frequencies and constituted by a binary digital signal representative of the data that the user peripheral 50 associated with the terminal desires to transmit; this signal is formed in a circuit 52 connected to the user peripheral; and
- a positioning assistance modulation component which is sinusoidal and at a frequency higher than the frequencies of the information-carrying modulation component, which component constitutes a positioning assistance frequency FS. This third component is applied to the emitter 1 by a positioning assistance generator 53.

An optical switch 34 serves to isolate the emitter from an emission fiber 61 while the terminal is being positioned. An optical coupler 33 takes a portion of the wave delivered by the emitter to mix it in another optical coupler 31 with the waves received over a reception fiber 62. The coupler 31 constitutes said emission positioning mixer. The resulting mixed waves are detected by an emission positioning detector 10 of the quadrature type. The resulting electrical signal constitutes said emission positioning beat signal. Its frequency is measured by an emission position discriminator 11 which is centered on the frequency DF−2FS. The discriminator delivers an emission position error signal for use in servo-controlling the emitter.

A heterodyning detector 20 detects the waves leaving a heterodyning mixer which is constituted by an optical coupler 32 and which receives the waves received over the reception fiber 62 and the wave emitted by the local oscillator 2. A reception position and frequency discriminator 21 centered on an intermediate frequency FI generates a reception position error signal enabling the local oscillator 2 to be servo-controlled. Information-extracting demodulation is performed on the signal detected at 20. It is performed by an amplifier circuit constituting a demodulation filter 22 centered on the intermediate frequency FI and by a regenerator 51 which reconstitutes the digital data in baseband for the user peripheral 50.

Overall control of the terminal is provided by a control circuit 40 which is constituted by a microcircuit and which is connected to the user peripheral 50 associated with the terminal.

The control circuit 40 has inputs which receive the error signals as digitized by an analog-to-digital converter 43. A memory 42 contains, in particular, the operating ranges of the lasers in the emitter 1 and the oscillator 2, i.e. a set of current values describing the tuning range of each of these lasers in steps. The circuit 40 generates reference signals and transmits them to a regulator circuit 41 which regulates the currents and the temperatures of the lasers. It also controls the state of the switch 34 connecting the emitter to the star coupler CE.

For this purpose, it is provided with software constituting the above-mentioned means and providing the following functions in particular:
- calculating the tuning currents for the emitter and the local oscillator as a function of the position error signals in such a manner as to maximize the signal delivered by the discriminator 11 and to cancel the error measured by the discriminator 21, with the position of the terminal in the stack or above the stack having no effect on this servo-control;
- implementing stack compression, i.e. detecting the disappearance of the call beneath by observing the variations in the power of the emission positioning beat signal and the 2×DF shift instruction which must result therefrom;
- taking account of control information from the user peripheral: call requests including the address of the called terminal, alarm signals, and security signals specifying an incorrect transmission that should be interrupted and subsequently restarted;
- taking account of signalling coming from the control unit when the terminal is on the shared channel, and in particular authorizations to establish wideband calls, i.e. so-called "heavyweight" calls that need to be established over a message channel; and
- setting up a call, and in particular if the call is a heavyweight call lowering the frequencies of the lasers from the signalling frequency down to the positions they are to occupy during the call in compliance with the process described above.

The network includes a control unit BG which includes, in particular, the above-described base generator, marking generators, and signalling reference generator. As shown in FIG. 3, the control unit contains five lasers as follows:
- a base generator B1 which is stabilized absolutely and which emits a base wave at a base frequency FO to constitute a reference at the bottom of the spectrum range of the network;
- two emitters B2 and B3 which are stabilized in relative manner and which emit the first and second marking waves to constitute two references at the top of the stack; and
- a signalling emitter B4 and a local oscillator B5 for use in dialoguing with free terminals over the shared channel.

A coupler B50 serves to inject the waves emitted by the sources B1, B2, B3, and B4 into an emission fiber B51 which is connected to the star coupler C3.

Figure 4:
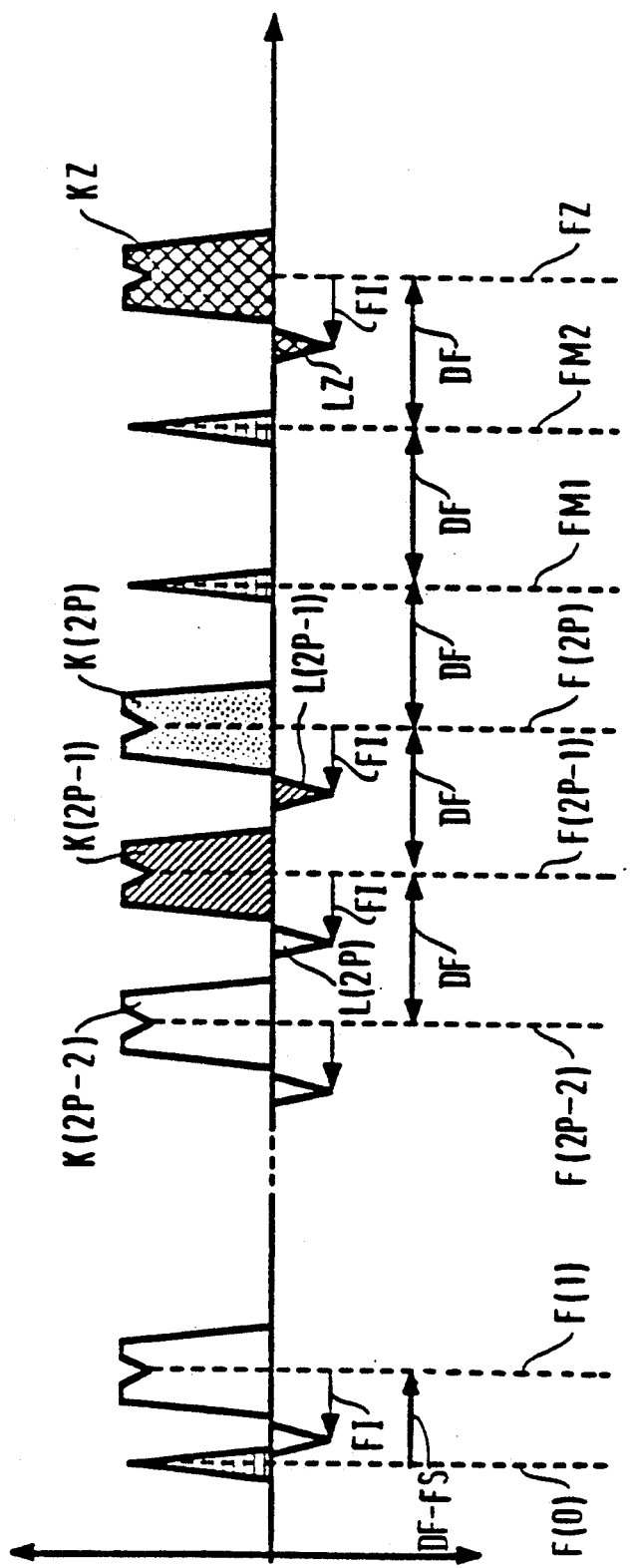
FIG. 4 shows the spectrum of various optical waves present on the first network.

The frequency FM1 of the first marking emitter B2 is servo-controlled (see FIG. 4) to a distance DF above the last message channel K(ZP). The frequency FM2 of the second marking emitter B3 is servo-controlled at a distance DF above the first marking frequency. The frequency of the signalling emitter B4 is servo-controlled to a distance DF above the second marking frequency. The emitters B2, B3, and B4 are subjected to positioning assistance modulation at the frequency FS so that the servo-control used can be identical to that used for the emitter of the terminal under consideration. For this purpose, a sinewave signal is delivered at the frequency FS by a positioning assistance generator B60.

Optical couplers B12, B13, and B14 are used to take fractions of the waves emitted by the emitters B2, B3, and B4 for the purpose of providing the beats required for servo-control purposes. Couplers B22, B23, B24, and B25 perform the following mixing operations respectively:

- mixing the first marking wave from the emitter B2 with the signal from a reception fiber B52 for servo-controlling said emitter;
- mixing the second marking wave from the emitter B3 with the first marking wave for servo-controlling said emitter;
- mixing the signalling reference wave from the emitter B4 with the second marking wave to servo-control said emitter; and
- mixing the wave from the local oscillator B5 with the signal from the coupler B22 to servo-control said local oscillator.

Positioning receivers B32, B33, B34, and B35 provide position error signals E2, E3, E4, and E5 for these four servo-control operations. Each of the receivers B32, B33, and B34 is constituted by a quadratic detector and a filter centered on the frequency DF−2FS. The receiver B35 is constituted by a frequency discriminator centered on the intermediate frequency FI.

A control circuit B70 has the following functions:

- it performs the servo-control operations, for which purpose it receives the position signals E2, E3, E4, and E5 for the lasers B2, B3, B4, and B5 respectively;
- it performs the protocol for gaining access to broadband communications by dialoguing with free terminals over the signaling channel, receiving messages D5 from these terminals via a demodulator B61, and transmitting messages D4 to these terminals by frequency modulating the signalling wave emitted by the emitter B4, thereby taking account of the various requests for broadband access and transmitting authorizations to set up calls; and
- it increases the frequencies of the lasers B2, B3, B4, and B5 by 2DF after a broadband call has been established so as to mark the new top of the stack taking support from the last emission frequency.

There follows a description of the setting up of a call and then the clearing down of a call.

Two free terminals are put into communication over the signalling channel KZ. The control unit is also present on this channel. It is aware of current call requests, of such priorities as may exist, and of how the spectrum range of the network is occupied. As a function of this information it allocates call entitlements over the message channels marked at the top of the stack and over the shared channel.

During the time taken by the terminals concerned to position themselves on these channels, the waves emitted by these terminals must not be injected into their emission fibers in order to avoid disturbing other calls passing through the star coupler CE. For this purpose, the emitters are temporarily disconnected from the coupler by the switches such as 34.

The calling terminal:
- reduces the frequency of its emitter by two 2×DF and it servo-controls it to DF above the highest emission frequency F(2P); and
- reduces the frequency of its local oscillator by DF and servo-controls it to F1 below the second marking frequency LM2.

The called terminal:
- reduces the frequency of its emitter by DF and servo-controls it to DF above the first marking frequency LM1; and
- reduces the frequency of its local oscillator by 2×DF and servo-controls it to FI below the first marking frequency.

The emitters are reconnected to the star coupler and the control unit increases the marking frequencies by 2×DF to servo-control them on the new top of the stack. All of the free terminals are servo-controlled to these frequencies so they follow this movement.

When a call is cleared down, the two terminals engaged in the call disconnect their emitters from the star coupler. In each of these terminals, the frequency of the local oscillator is then temporarily servo-controlled on the emitter. The frequency of the emitter is increased to the top of the stack which it recognizes by detecting the two marking waves. The local oscillators and emitters can then be servo-controlled again on the signalling frequency. The calling terminal of the next call up detects that emission from the terminal beneath it has disappeared and shifts its emission frequency progressively through 2×DF to fill up the gap released by the call that has finished. All of the higher channels in the stack including the signalling channel follow this shift.

FIGS. 4 to 9 show the frequency spectrum of the network when a number P of calls are in progress, with the number 2P being less than the number N of the terminals. These figures show, in particular, a top pair of channels constituted by message channels K(2P−1) and K(2P) used by the top pair of terminals, i.e. the pair of terminals whose emission frequencies F(2P−2) and F(2P) are the furthest from the base frequency F(0).

These two channels are shown with two different types of shading, with a given type of shading being used for all of the waves emitted by a given terminal and for all of the electrical signals that result therefrom. The top pair is the pair conveying the call that has most recently been set up on the network. That is why it is at the top of the stack. More precisely, the calling channel K(2P−1), i.e. the channel used by the calling terminal, constitutes the lower channel of said top pair, with this terminal thus constituting the lower terminal of this pair of terminals. In similar manner, the channel called K(2P) constitutes the upper channel of the same pair.

The emission frequencies of these two terminals are written respectively F(2P−1) and F(2P). These frequencies are the mid-frequencies of the corresponding channels.

The local reception waves L(2P−1) and L(2P) which are generated in these two terminals respectively are represented beneath the frequency axis to facilitate understanding the drawing. The message channels occupied by other terminals are shown without shading, and in particular the upper channel K(2P−2) occupied by the upper terminal of the top-but-one pair of terminals.

The emission frequency F(2P−2) which is situated in the middle of the channel K(2P−2) constitutes the lower support frequency for the terminal occupying the channel K(2P−2). The mid-frequency F(2P−1) of this channel constitutes the lower support frequency for the terminal occupying the channel K(2P).

In general, the frequency differences established over the network are represented by heavy horizontal arrows, with the arrow heads designating frequencies that are controlled or predetermined to ensure said differences.

Emission frequency servo-control is generally bilateral servo-control. That is why the servo-control arrows such as the arrow between frequencies F(2P) and F(2P−1) are generally two-headed arrows.

Emission frequency F(1) which is situated at the bottom of the stack is servo-controlled unilaterally relative to the base frequency F(0). The distances between terminals servo controlled in this way are equal to the frequency increment DF, with the distance between the frequencies F(1) and F(0) being the positioning assistance frequency.

The signalling channel is shown at KZ. The frequencies of the signalling reference wave and of the local reception wave of the signalling generator BG are shown at FZ and LZ, and the first and second marking frequencies are shown at FM1 and FM2, respectively.

The servo-control of the frequencies F(2P), FM1, and FM2 is bilateral. The servo-control of the frequency F2 is unilateral.

Figure 5:
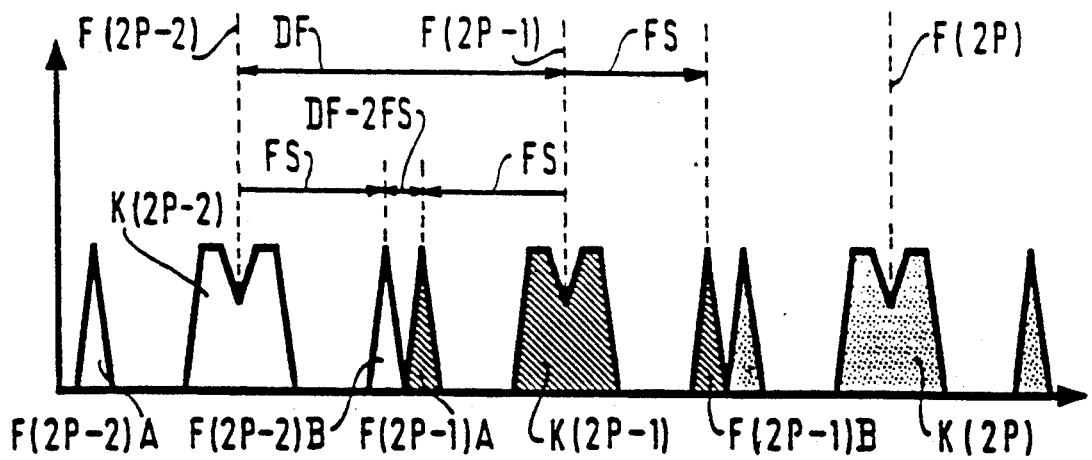
FIG. 5 shows the spectrum of various optical waves present on the reception fiber of a terminal belonging to the first network.

FIG. 5 shows the message channels K(2P−2), K(2P−1), and K(2P), together with their mid-frequencies F(2P−2), F(2P−1), and F(2P). This figure also shows said first and second positioning assistance side frequencies F(2P−1)A and F(2P−1)B of the terminal under consideration which occupies the channel K(2P−1). These frequencies are respectively equal to F(2P−1)−FS and F(2P−1)+FS.

For the channel K(2P−2) the corresponding waves are shown at (F(2P−2)A) and (F(2P−2)B), respectively. The lower support distance F(2P−1)−F(2P−2) of the terminal occupying the channel K(2P−1) is maintained equal to the frequency increment DF because the difference between the frequencies F(2P−1)A and (F(2P−2)B) is maintained equal to said emission positioning reference frequency which is equal to DF−2FS.

Figure 6:
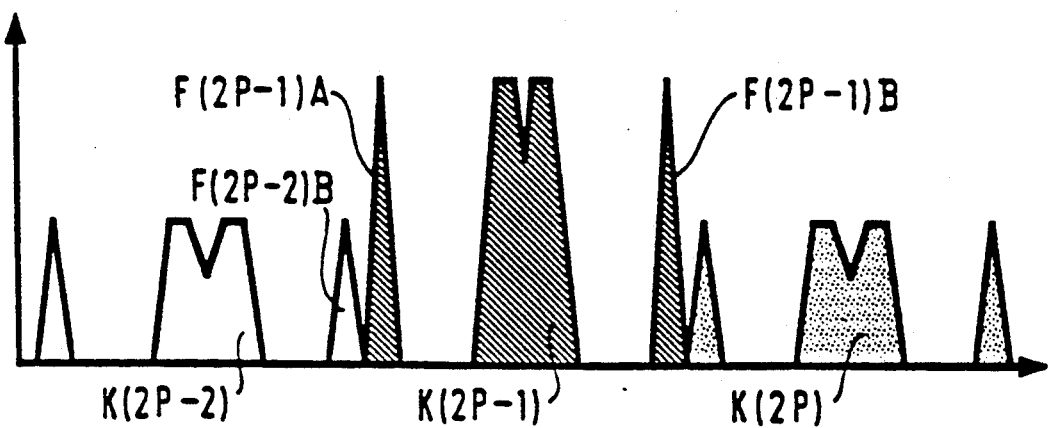
FIG. 6 shows the spectrum of the optical waves of FIG. 5 after said waves have been mixed with the optical waves emitted by the emitter in the same terminal.

FIG. 6 shows the spectrum of the same optical waves at the inlet to the detector 10 of the terminal under consideration. It differs from FIG. 5 by the waves from the emitter 1 being of increased relative intensity, i.e. the waves occupying the channel K(2P−1) and the side frequencies (F(2P−1)A) and (F(2P−1)B).

Figure 7:
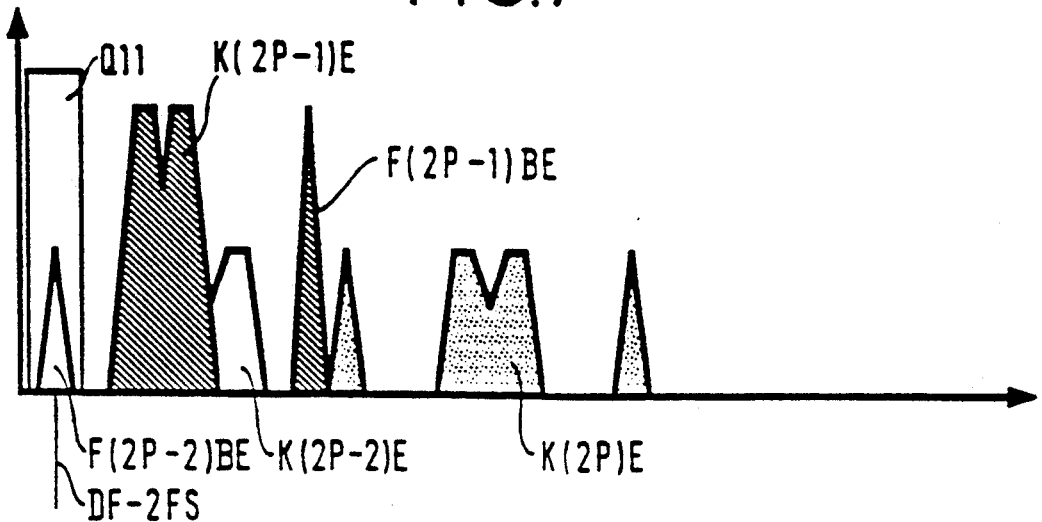
FIG. 7 shows the spectrum of electrical signals that results from detecting the optical waves of FIG. 6 to enable the spectrum position of the emitter in the terminal of FIG. 2 to be servo-controlled.

FIG. 7 is a diagram showing a theoretical spectrum of the electrical signals that result from detecting said waves in the detector 10. The passband of the discriminator 11 is centered on the positioning reference frequency DF−2FS and is shown at Q11. The signals resulting from detecting some of the waves are designated by the references for said waves plus the letter E. Their frequencies are equal to the difference between the frequencies of said waves and the first positioning assistance side frequency (F(2P−1)A) of said terminal which is one of the higher power frequencies. It will be understood that some signals have been omitted such as those that result from beats of various waves with the channel K(2P−1) or with the frequency (F(2P−1)B) which also correspond to high powers. It will also be understood that some signals such as K(2P)E are shown to facilitate understanding but that they are at frequencies which are too high to appear in fact in electrical form at the outlet from the detector.

Figure 8:
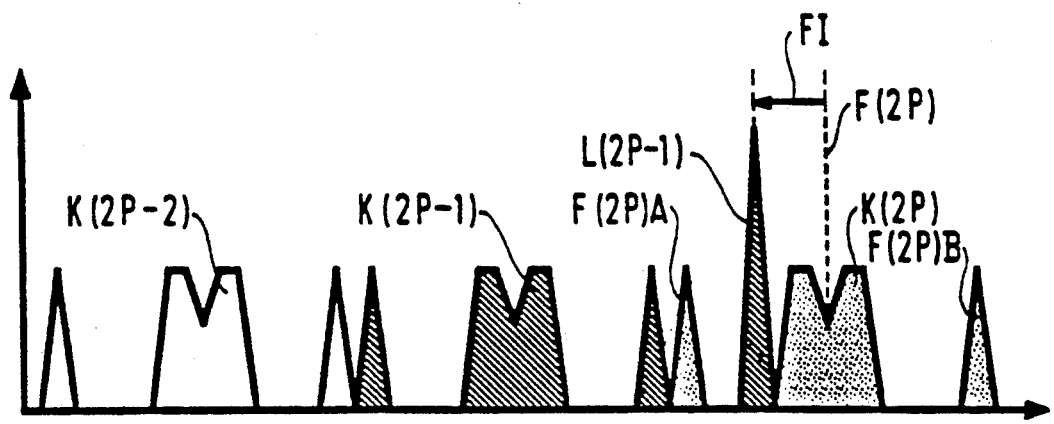
FIG. 8 shows the spectrum of the optical waves of FIG. 5 after these waves have been mixed with the optical wave emitted by the local oscillator in the terminal of FIG. 2.

FIG. 8 represents the optical spectrum at the inlet of the terminal 20 in the terminal under consideration. In this spectrum the highest power wave is the local reception wave coming from the local oscillator 2 and its frequency is designated by reference L(2P−1) and is equal to F(2P)−FI because of the servo-control performed by means of the detector 20.

Figure 9:
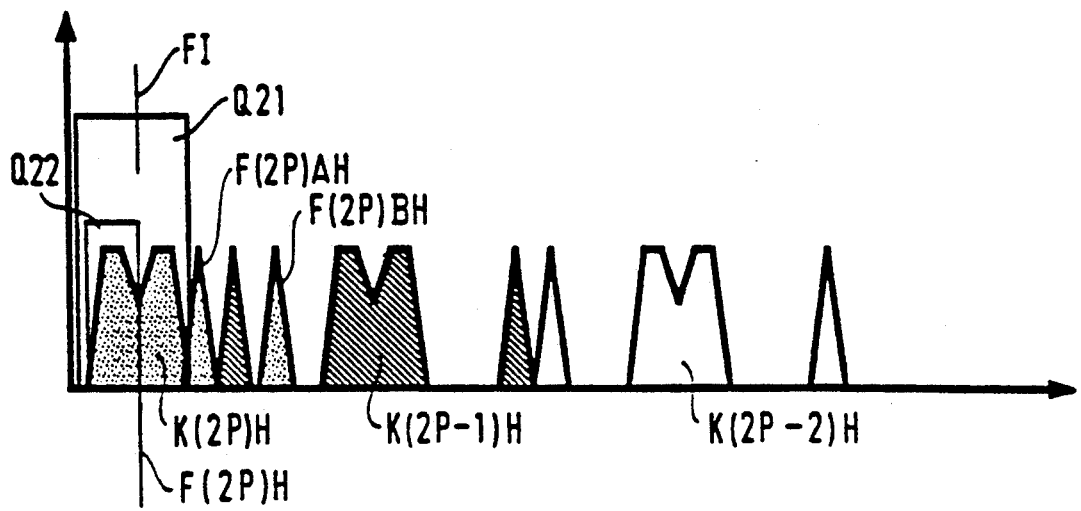
FIG. 9 shows the spectrum of the electrical signals that result from detecting the optical signals of FIG. 8 to enable the frequency of the local oscillator of the terminal of FIG. 2 to be servo-controlled.

FIG. 9 shows the electrical signals resulting from some of these waves being detected by the detector 20, with the electrical signals being designated by the same references as said waves plus the letter H. Their frequencies are equal to the difference between the frequencies of said waves and the high power frequency L(2P−1). The same remarks apply as applied to FIG. 7.

The passbands of the discriminator 21 and of the amplifier and filter circuit 22 are shown as Q21 and Q22 respectively.

Figure 10:
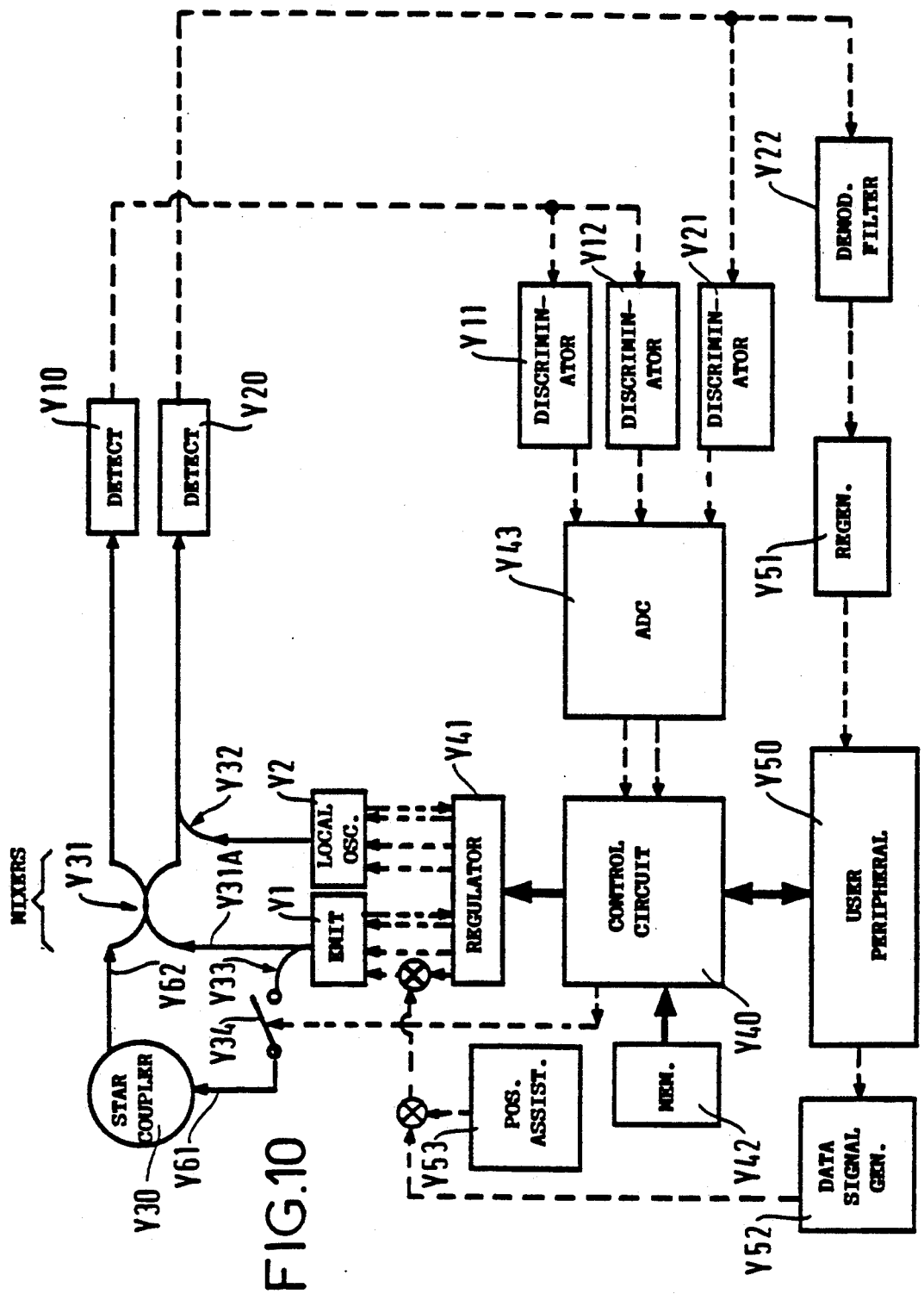
FIG. 10 is a block diagram of a terminal in a second network given as an example of an implementation of the present invention.

The second network constituting an embodiment of the present invention is now described. This network is shown in FIG. 10. It is generally similar to the above-described first network except that it operates in alternating mode and compared with the first network it has dispositions that differ at least in part and that are adapted to this mode of operation, with some of them now being described.

Firstly, and in general, it is advantageous for said support discrimination means of the terminal under consideration in a network operating in alternating mode to include means for forming the support discrimination wave that are put into action by said loss-of-support signal to provide a support discrimination wave to said local input (Y31A) of said emission positioning mixer (Y31) of the terminal, which support discrimination wave has a support discrimination frequency at a support discrimination spectrum difference from a value of said local emission positioning frequency immediately prior to said loss-of-support signal being formed that is suitable to cause a positioning difference to appear affecting the frequency of said emission positioning beat signal, said positioning difference being capable of having one or other of two algebraic signs, positive and negative; said loss-of-lower-support signals being provided when said positioning difference has a predetermined algebraic sign.

In another advantageous disposition, the support discrimination wave fanning means are means for giving rise to an emission difference that temporarily affects the emission frequency of the terminal under consideration. This emission difference may be positive, for example i.e. the emission frequency may be moving temporarily a little further from the base frequency. When the positioning assistance frequency FS is less than half the frequency increment DF, the loss-of-lower-support signal will be provided and the emission frequency will be shifted progressively towards the base frequency if the emission positioning beat signal is subjected to a negative frequency difference. This may be detected, for example, by a control circuit Y40 at the output of a support discriminator Y12 constituted by a frequency discriminator provided for this purpose and fed from the output of the emission positioning detector Y10.

Figure 2:
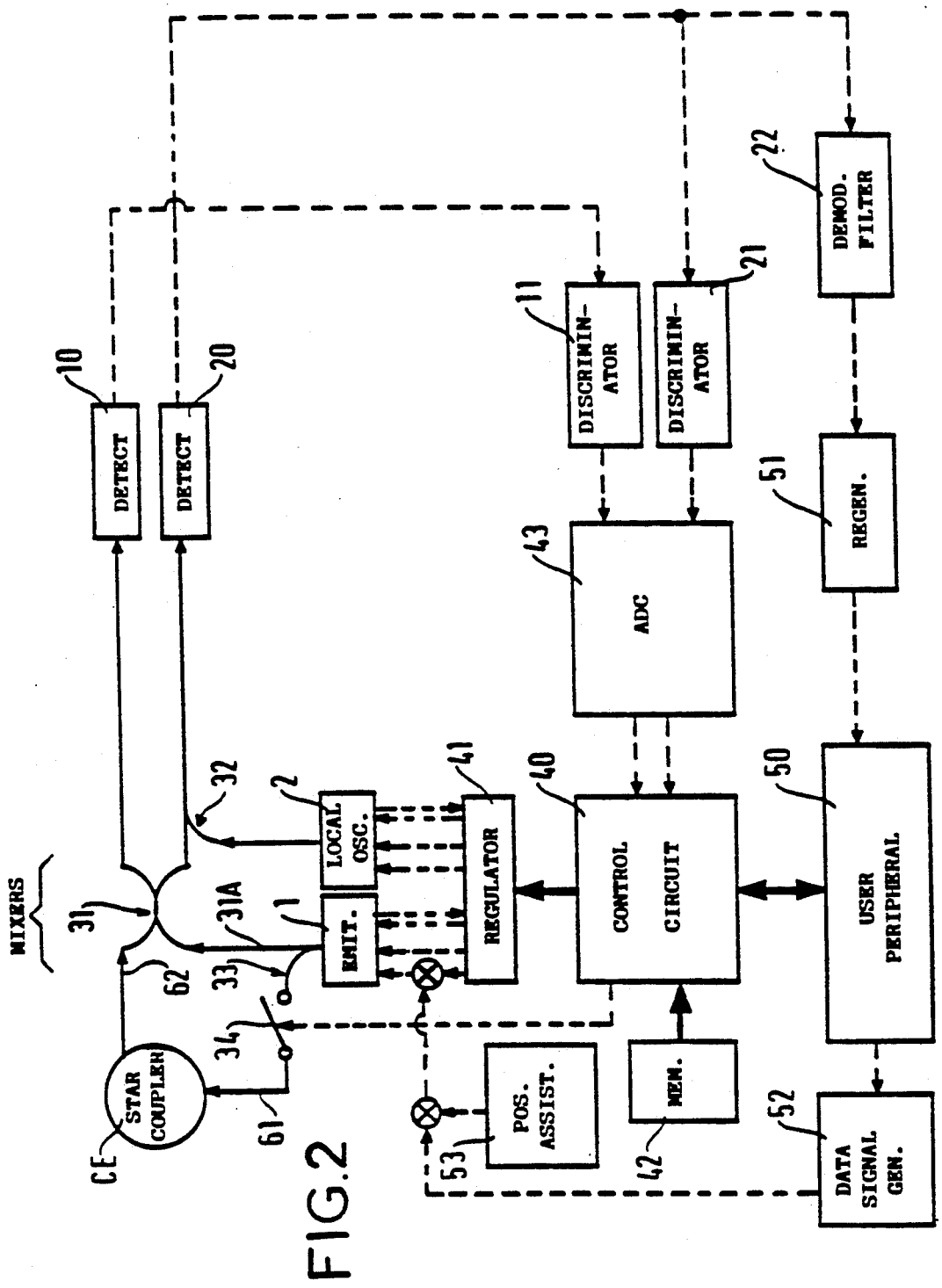
FIG. 2 is a block diagram of a terminal in the first network.

As shown in FIG. 10, the terminal under consideration of the network operating in alternating mode includes items analogous to those of the terminals shown in FIG. 2 except that the support discriminator Y12 is added and the control circuit Y40 is partially modified. When two items in these two terminals are analogous, the reference symbols designating these two items are the same except that the letter "Y" is added to the beginning of the reference symbols used for items in the terminal shown in FIG. 10.

We claim:

1. A communications method with frequency allocation in which calls are made between terminals each in the form of information-carrying modulation applied to a respective emission wave transmitted from a respective one of the terminals to all of the terminals, center frequencies of said emission waves constituting emission frequencies, each call using a respective initial emission frequency which is allocated to that call when that call is set up and which is reserved for that call, wherein a marking emission wave is transmitted to all of the terminals having an associated center frequency with a predetermined relationship to a respective marked frequency to thereby mark said respective marked frequency, said respective marked frequency constituting during the setting up of a new call said initial emission frequency allocated to said new call, with a new marking emission wave marking a new marked frequency being transmitted once said new call has been set up.

2. A communications network with frequency allocation, the network comprising:

a plurality of terminals associated with respective user peripherals between which messages are to be transmitted, each of the terminals including means for emitting a respective controlled emission wave at a variable controlled emission frequency which constitutes a current frequency position for said each terminal in a spectrum range of the network, and means for applying information-carrying modulation to said wave to cause it to convey one of said messages;

two transmission lines associated with each of said terminals which respectively constitute an emission line for guiding said respective controlled emission wave from said each terminal and a reception line for guiding received emission waves received by said terminal;

a star coupler for receiving all said respective controlled emission waves via said emission lines and for transmitting each of said respective controlled emission waves to all of said terminals via said reception lines such that the frequency positions of the various terminals remain at mutual distances apart that are not less than a predetermined frequency increment; and spectrum allocation means for allocating variable frequency positions to said terminals for the calls in which they are to participate, said spectrum allocation means comprising a marking generator provided with an emission line connecting it to said star coupler to provide all of said terminals with a marking emission wave having a predetermined relationship with a marked frequency position constituting a new frequency position to be used by any of said terminals for transmitting a next one of said messages.

3. A network according to claim 2, wherein said marking generator provides said marking wave on a permanent basis at a controlled frequency, said generator being provided with a reception line connecting it to said star coupler to receive all of said emission waves therefrom, and said marking generator further comprises:

marking position servo-control means for maintaining said marking frequency at a spectrum distance of not less than said frequency increment from the possibly variable frequency position of one of said terminals that is transmitting one of said messages; and means for changing said marked frequency position in a predetermined manner after said new frequency position has been reserved for the transmission of said next message.

4. A network according to claim 2, wherein said predetermined relationship is that said marking frequency is situated at a predetermined spectrum distance from said marked frequency position, and each of said terminals further comprises at least one positioning mixer for mixing said marking wave with at least one wave generated locally from at least one frequency controlled source in such a manner as to cause at least one positioning beat frequency to appear; and frequency control means responsive to said positioning beat frequency and controlling said frequency controlled source to move said frequency towards a reference frequency.

5. A network according to claim 4, in which one of said frequency controlled sources is selected from the group consisting of an emitter emitting one of said emission waves and a local oscillator of a heterodyne type receiver.

6. A network according to claim 2, in which said emission waves are optical waves and said transmission lines are optical fibers.

* * * * *